United States Patent

Grobert

[15] 3,670,155

[45] June 13, 1972

[54] HIGH FREQUENCY FOUR QUADRANT MULTIPLIER

[72] Inventor: Paul H. Grobert, Thousand Oakes, Calif.

[73] Assignee: Communications & Systems, Inc.

[22] Filed: July 23, 1970

[21] Appl. No.: 57,480

[52] U.S. Cl. ....................235/194, 328/160
[51] Int. Cl. ....................G06g 7/16
[58] Field of Search ....................235/194, 195, 196, 197; 328/160, 161, 133, 134; 307/229, 230; 331/38

[56] References Cited

UNITED STATES PATENTS

| | | | |
|---|---|---|---|
| 3,092,720 | 6/1963 | De Vrijer et al. | 235/194 X |
| 2,902,218 | 9/1959 | Meyer | 235/194 |
| 3,013,724 | 12/1961 | Thompson et al. | 235/194 |
| 3,363,188 | 1/1968 | Gardere | 328/160 X |

*Primary Examiner*—Joseph F. Ruggiero
*Attorney*—Beveridge & De Grandi

[57] ABSTRACT

There is disclosed a four quadrant multiplier for producing the bi-polar product of a pair of extremely high frequency sgined signal voltages. The invention features the use of a conventional analog mixers and a phase linearizing loop to achieve four quadrant multiplication with low distortion.

7 Claims, 1 Drawing Figure

PATENTED JUN 13 1972
3,670,155
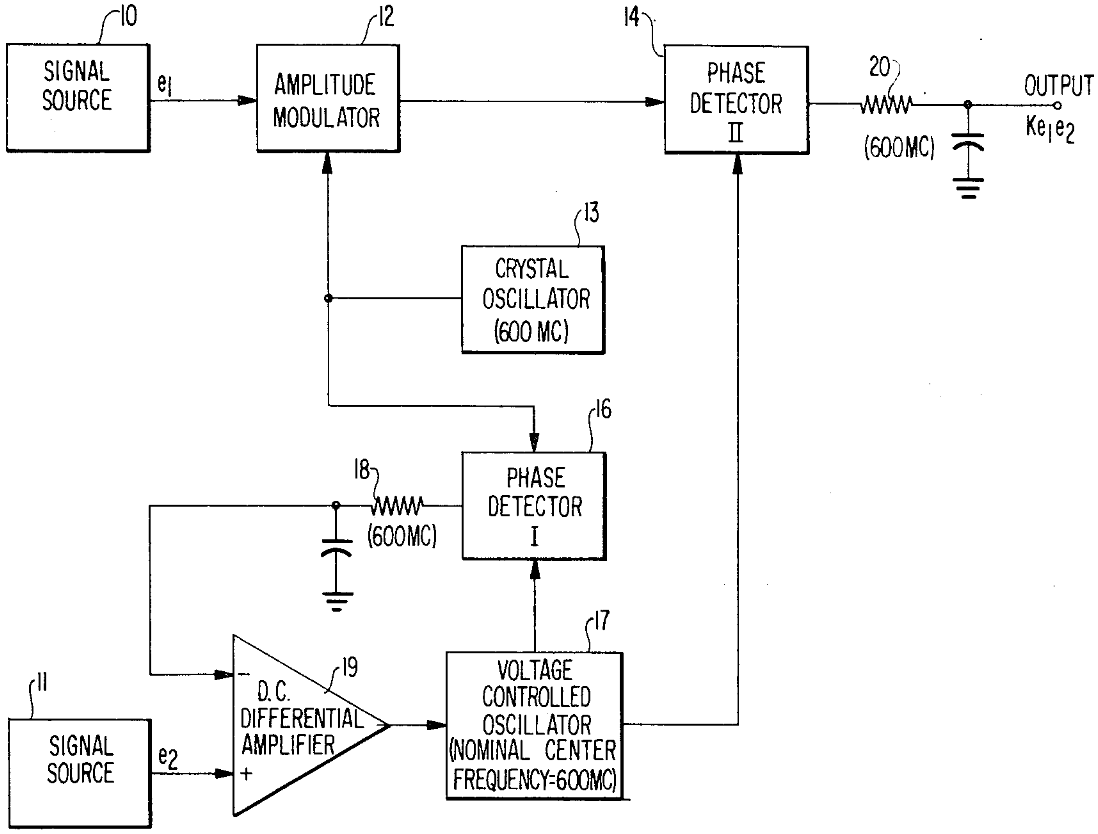
INVENTOR
PAUL HENRY GROBERT
BY Beveridge & DeGrandi
ATTORNEYS

HIGH FREQUENCY FOUR QUADRANT MULTIPLIER

The invention herein described was made in the course of or under a contract or subcontract thereunder, or grant with the Department of the Air Force.

The present invention relates in general to four quadrant multiplier circuits and systems and, in particular, relates to a four quadrant multiplier where the two signals to be multiplied may be of extremely high frequencies.

BACKGROUND OF THE INVENTION

In signal processing systems, the need often arises to form the bi-polar product of two signed voltages (e.g., four quadrant multiplication). In certain applications, the signals to be multiplied may be of extremely high frequency. Presently available techniques to perform this operation are limited to approximately 10 megacycles. The present invention is directed to a low distortion, four quadrant multiplier whose output is the bi-polar product of two signed analog voltages capable of operating to frequencies of approximately 100 megacycles and greater, the main limitation on frequency of operation being in the direct current differential amplifier.

DESCRIPTION OF A PREFERRED EMBODIMENT

The accompanying drawing is a block diagram of a circuit incorporating the invention for producing the bi-polar product of two signed voltages $e_1$ and $e_2$ from sources 10 and 11, respectively. Signed analog signal voltage $e_1$ is applied as one input to amplitude modulator 12 which, preferably, is a double balanced mixer of the ring modulator type used as a conventional double side band suppressed carrier amplitude modulator. The second input to amplitude modulator 12 is received from a fixed or stable frequency oscillator such as crystal oscillator 13 which operates at a frequency of 600 megacycles. This frequency is arbitrarily selected. However, it must be consistent with the frequency response of presently available double balanced mixers. A high frequency is preferred since the higher frequency, the easier it is to filter the output without imposing a time constant penalty at the output of the circuit.

The amplitude of the output of amplitude modulator 12 is thus linearly related to $e_1$ (to within a tolerance specified for a selected maximum value of $e_1$) and the phase is either that of a crystal oscillator 13 for a positive $e_1$ or 180° out of phase with respect to the output of crystal oscillator for negative $e_1$ signal voltages. The output of amplitude modulator 12 is applied to phase detector 14 which, like amplitude modulator 12 is a double balanced mixer of the ring modulator type but in this case used as a phase sensitive detector or demodulator and, its function will be described more fully hereinafter. Since, as is well known, the output of a ring modulator type of phase detector is not a linear function of the phase angle between two sinusoidal RF inputs, a phase linearizing loop is used because one of the principal objects of the multiplier is to produce the product of the two input signals $e_1$ and $e_2$ with as little distortion as possible.

The phase linearizing loop includes phase detector 16, which like phase detector 14, is a double balanced mixer of the ring modulator type used as a phase sensitive detector or demodulator. The first input to phase detector 16 is the high frequency output from crystal oscillator 13. The second input to phase detector 16 is from voltage controlled oscillator (vco) 17 which has a nominal center frequency which is the same as the frequency of the crystal oscillator, and in this example is 600 megacycles. As in the case of crystal oscillator 13, this frequency is consistent with the frequency response of presently available double balanced mixers. The output of phase detector 16 is filtered in filter 18 which filters out any 600 megacycle component. Since there is no noise bandwidth requirements in the loop, filter 18 need only remove any 600 megacycle component. This filtered signal voltage from phase detector 16 is applied as one input to direct current differential amplifier 19. Amplifier 19 may be of the RCA CA 3028B integrated circuit type. The frequency limitation of 100 megacycles referred to above is imposed by the frequency response of the direct current differential amplifier 19. However, it is apparent that higher operating frequencies may be used with differential amplifiers having higher frequency responses. The second input to amplifier 19 is constituted by the signed analog signal voltage $e_2$ from source 11. The output of differential 19 is applied to voltage controlled oscillator 17 so that the operation of this portion of the phase linearizing loop is to phase lock the frequency of voltage controlled oscillator 17 to that of crystal oscillator 13. Amplifier 19 causes the output of phase detector 16 to follow signal voltage $e_2$ (to within the loop error). In this way the phase of voltage controlled oscillator 17 is forced to be that which causes the output of phase detector 16 to linearly follow $e_2$. Since the same frequency and phase (if $e_1$ is negative the phase will reverse 180°) are applied to phase detector 14 from the output of amplitude modulator 12, its output will also be a linear function of $e_2$ inasmuch as phase detectors 14 and 16 are identical. Thus, the output of phase detector 14 is proportional to (1) $e_2$ and (2) the output of the amplitude modulator 12 and hence is equal to $Ke_1 e_2$ where K is an overall gain constant. A further filter 20 at the output of phase detector 14 is used to remove any 600 megacycle component in the output of the circuit.

Amplitude modulator 12, phase detectors 14 and 16, crystal oscillator 13 and amplifier 19 as well as filters 18 and 20 are all conventional and/or commercially available components and their specific manner of operation to perform the functions described herein are well known and need not be described in detail.

What is claimed is:

1. A four quadrant multiplier circuit for obtaining the bi-polar product of a pair of signed signal voltages, comprising,
   - a double side band suppressed carrier modulator,
   - means for supplying (1) a fixed frequency voltage and (2) one of said signed signal voltages to said modulator,
   - means for translating the second of said signed signal voltages to a voltage having a phase locked in synchronism to the phase of said fixed frequency voltage,
   - a phase detector of the ring modulator type,
   - means for applying (1) the output of said modulator and (2) the output of said means for translating to said phase detector, and
   - means for obtaining an output signal from said phase detector which is proportional to the bi-polar product of said signed signal voltages.

2. A multiplier circuit for obtaining the bi-polar product of a pair of high frequency signal voltages, comprising,
   - means for supplying a fixed frequency voltage which is higher in frequency than the frequency of said pair of signal voltages,
   - an amplitude modulator,
   - means for applying one of said signal voltages and said fixed frequency voltage to said amplitude modulator to produce a sideband voltage having an amplitude proportional to said one signal voltage and in phase with said one fixed frequency voltage when said one signal voltage is of one polarity and 180° out of phase with said fixed frequency voltage when said one signal voltage is of opposite polarity,
   - a phase linearizing loop including a phase detector, a voltage controlled oscillator having a nominal center frequency the same as said fixed frequency voltage, and a differential amplifier, means for applying said fixed frequency voltage as one input to said phase detector and the signal from of said voltage controlled oscillator as the second input thereto, means for applying the output of said phase detector as one input to said differential amplifier and the second of said two high frequency signals voltages as the second input to said differential amplifier, means applying the output of said amplifier to said voltage controlled oscillator to control same,
   - a second phase detector, means for applying the outputs of said amplitude modulator and said voltage controlled oscillator to said second phase detector and means for obtaining an output signal from said second phase detector proportional to the bi-polar product of said two high frequency signals.

3. The invention defined in claim 2 wherein said phase detectors are identical and constituted by double balanced mixer circuits.

4. The invention defined in claim 2 wherein said amplitude modulator and said phase detectors are substantially identical and are constituted by double balanced mixer circuits.

5. The invention defined in claim 4 wherein each said double balanced mixer circuits is of the ring modulator type.

6. The invention defined in claim 2 including filter means connected between the first said phase detector and said differential amplifier for removing any component of said fixed frequency voltage from the voltage applied to said differential amplifier.

7. The invention defined in claim 2 wherein said differential amplifier has a frequency response characteristic which is at least as high as the frequency of the high frequency signal voltage applied thereto.

* * * * *